Feb. 27, 1923.
E. E. MILLER ET AL.
EXPANSIBLE PACKING.
FILED SEPT. 15, 1921.
1,446,919.
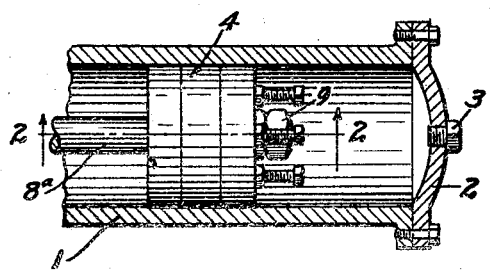
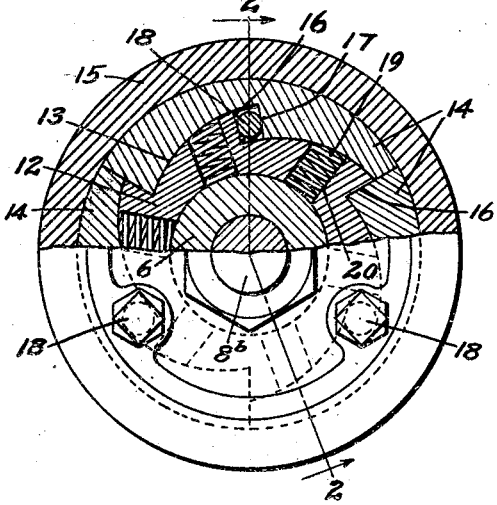
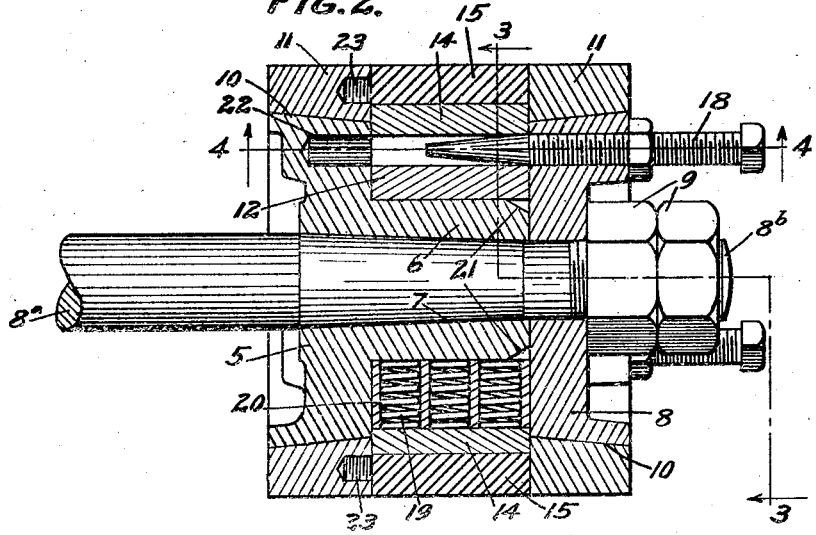
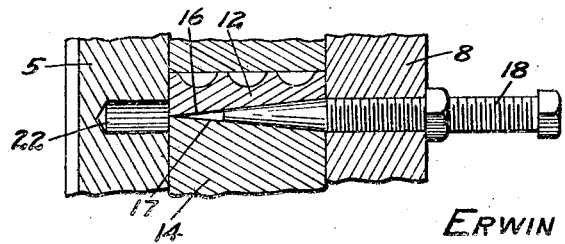
INVENTOR
ERWIN E. MILLER
GEORGE P. CRONER
BY Herman Miller
ATTORNEY.

Patented Feb. 27, 1923.                                                              1,446,919

UNITED STATES PATENT OFFICE.

ERWIN E. MILLER AND GEORGE PATTON CRONER, OF FULLERTON, CALIFORNIA.

EXPANSIBLE PACKING.

Application filed September 15, 1921. Serial No. 500,255.

*To all whom it may concern:*

Be it known that we, ERWIN E. MILLER and GEORGE P. CRONER, citizens of the United States, residing at Fullerton, in the county of Orange and State of California, have invented new and useful Improvements in Expansible Packings, of which the following is a specification.

This invention relates to an expansible packing for a piston which is ordinarily used in pumps or similar machinery where grit or other foreign substances cause rapid wear of the packing which will allow the working fluid to leak by the piston.
It is the object of this invention to provide a novel means whereby the packing can be expanded as this wear takes place.

Other objects and advantages will be seen and the invention readily understood from the following description of the accompanying drawings, in which:

Fig. 1 is a central longitudinal section of a pump cylinder showing in elevation our improved expansible packing employed in combination with a piston.

Fig. 2 is an enlarged central section of our improved expansible packing taken on the line 2—2 of Fig. 1.

Fig. 3 is an end elevation of a piston partly broken away to show our improved expansible packing member.

Fig. 4 is a section taken on line 4—4 of Fig. 2.

A practical embodiment of our improved expansible packing member is illustrated as mounted within a cylinder 1, having an end plate 2, with a central opening adapted to receive a plug 3, the use of which will be hereinafter described.
The piston 4, is shown as comprising an end disk 5, having a forwardly projecting hub portion 6 with a tapered axial bore 7, adapted to fit upon the tapered portion of a piston rod 8ª.
A second end plate 8, is mounted upon the reduced end 8ᵇ of the piston rod and is adapted to be held against the hub as by lock nuts 9, screw-threaded upon the portion 8ᵇ.
The periphery of the end plates are tapered inwardly toward each other as shown at 10 and piston follower rings 11, having co-operating, tapering surfaces are mounted thereon so as to form a complete end plate with the removable wearing ring.

The expansible packing member comprises a cam 12, having an axial bore adapted to be received upon the hub 6.

A plurality of curved cam surfaces 13, are formed on the outer surface of the cam and the expansible portion of our packing member comprises a plurality of cam block sections 14.

In the present illustration, three of such cam blocks are shown, but it will be understood that this number can be increased or decreased according to the size of the piston. We do not necessarily limit ourselves to three.

Surrounding the cam blocks is the usual packing 15, which can be readily replaced when the same has been worn out.

It is thus seen that if the cam 12 and the cam blocks 14 are shifted relative to each other, that the packing 15 will be forced radially outward, and to provide means for accomplishing this purpose, the cam surfaces 13 terminate in a shoulder 16 of the cam 12, and a shoulder 17 of the cam block 14.

These shoulders are longitudinally tapered and adapted to receive a co-operating tapered, expanding screw 18, screw-threaded through the end plate 8. These screws are shown as three in number and positioned intermediate the sides of the respective cam block sections.

In the operation, it will be seen that as the screws are advanced inwardly, the cam and cam blocks will be shifted relative to each other so as to cause the packing 15 to expand.

Between the times that the screws are adjusted for taking up the wear of the packing member, means are provided for normally creating a radial pressure during this elapsed time, and such means comprises springs 19, positioned in radial slots 20 formed in the cam 12, and these springs are shown as positioned one set at each cam surface.                           

To allow these springs to be easily inserted within the section, the outer corner of the hub is tapered as at 21, and it will thus be seen that when the cam is placed upon the hub, the springs can be inserted within the slots and easily forced upward within the same by placing the inner end on the inclined surface 21 and then shifting the cam axially along the hub.

To allow the greatest amount of expansion by the screws within the least axial space, holes 22 are formed within the disk 5 and in axial alinement with the screws so that the ends of the same can enter these openings when the expanding limit of the screws is about reached.

Means for adjusting these screws while the expansible packing is employed within a piston cylinder, is obtained by removing the plug 3 and inserting any suitable socket wrench so as to rotate the screws and thereby causing the necessary expansion of the packing 15.

It may be necessary to remove the ring 11 from the disk 5, and to do so without hammering the ring, bolt holes 23 are formed in the ring so that a bolt may be inserted in the same and any suitable means may be applied to the bolts for causing axial pressure for the removal of the ring.

Various changes may be made in the details of construction by those skilled in the art, without departing from the spirit of the invention as set forth in the appended claims.

We claim as our invention:

1. An expansible packing for pistons, comprising a cam, a cam block, a packing surrounding said cam block, said cam and block having tapered portions, and tapered screws adapted to fit said portions so as to wedge said cam and block apart and cause relative rotation of the same to expand said packing.

2. An expansible packing for pistons, comprising a cam, cam blocks, springs mounted in said cam and causing radial pressure upon said cam blocks, and means for rotatably shifting said cam and block relative to each other.

3. A piston having end plates, an intermediate portion between said plates, and removable wearing annuli carried solely on the peripheries of said end plates.

4. An expansible packing for pistons comprising a cam, cam blocks, springs mounted in said cam and causing radial pressure upon the cam blocks, and packing surrounding the cam blocks, said cam and blocks having tapered portions, and tapered screws adapted to fit said portions so as to wedge the cam and blocks apart and cause relative rotation of the same to expand said packing.

5. A piston comprising end plates having conical-shaped peripheries, and removable wearing annuli carried on the peripheries of the end plates and having internal peripheries corresponding in shape to the external peripheries of the plates so as to contact with the latter throughout their transverse areas.

6. A piston comprising end plates having conical-shaped peripheries, removable wearing annuli carried on the peripheries of the end plates and having internal peripheries corresponding in shape to the external peripheries of the plates, a cam mounted between the plates for rotation, cam blocks surrounding the cam, a packing surrounding the cam blocks, and means for effecting relative rotation of the cam and blocks.

7. A piston comprising end plates having conical-shaped peripheries, removable wearing annuli carried on the peripheries of the end plates and having internal peripheries corresponding in shape to the external peripheries of the plates, a cam mounted between the plates for rotation, cam blocks surrounding the cam, a packing surrounding the cam blocks, and cam screws interposed between the cam blocks and cam for effecting relative rotation of the two.

8. A piston comprising end plates having conical-shaped peripheries, removable wearing annuli carried on the peripheries of the end plates and having internal peripheries corresponding in shape to the external peripheries of the plates, a cam mounted between the plates for rotation, cam blocks surrounding the cam, a packing surrounding the cam blocks, and cam screws interposed between the cam blocks and cam for effecting relative rotation of the two, one of said end plates being provided with openings adapted to receive the cam screws for the purposes described.

9. A piston comprising end plates having conical-shaped peripheries, removable wearing annuli carried on the peripheries of the end plates and having internal peripheries corresponding in shape to the external peripheries of the plates, a cam mounted between the plates for rotation, cam blocks surrounding the cam, a packing surrounding the cam blocks, cam screws interposed between the cam blocks and cam for effecting relative rotation of the two, said cam blocks being formed with slots, and expansible springs within said slots and engaging said cam for the purpose described.

10. A piston comprising end plates having conical-shaped peripheries, removable wearing annuli carried on the peripheries of the end plates and having internal peripheries corresponding in shape to the external peripheries of the plates, a cam mounted between the plates for rotation, cam blocks surrounding the cam, a packing surrounding the cam blocks, and cam screws interposed between the cam blocks and cam for effecting relative rotation of the two, one of said end plates being provided with openings adapted to receive the cam screws for the purposes described, one of said wearing annuli being formed with bolt receiving openings for the purpose described.

In testimony whereof we have signed our names to this specification.

ERWIN E. MILLER.
GEORGE PATTON CRONER.